United States Patent
Natsumeda

(10) Patent No.: US 10,346,758 B2
(45) Date of Patent: Jul. 9, 2019

(54) SYSTEM ANALYSIS DEVICE AND SYSTEM ANALYSIS METHOD

(71) Applicant: NEC Corporation, Minato-ku, Tokyo (JP)

(72) Inventor: Masanao Natsumeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1000 days.

(21) Appl. No.: 14/767,667

(22) PCT Filed: Feb. 24, 2014

(86) PCT No.: PCT/JP2014/000950
§ 371 (c)(1),
(2) Date: Aug. 13, 2015

(87) PCT Pub. No.: WO2014/132612
PCT Pub. Date: Sep. 4, 2014

(65) Prior Publication Data
US 2015/0379417 A1    Dec. 31, 2015

(30) Foreign Application Priority Data
Feb. 26, 2013    (JP) ................. 2013-035785

(51) Int. Cl.
*G06F 11/00*    (2006.01)
*G06N 7/00*    (2006.01)
(Continued)

(52) U.S. Cl.
CPC ......... *G06N 7/005* (2013.01); *G05B 23/0221* (2013.01); *G06F 11/006* (2013.01);
(Continued)

(58) Field of Classification Search
CPC ............. G06F 11/1079; G06F 11/2257; G06F 11/0709; G06F 11/079; G06F 11/2263

USPC .......................................................... 714/26
See application file for complete search history.

(56) References Cited

U.S. PATENT DOCUMENTS

2006/0047454 A1    3/2006    Tamaki et al.
2009/0217099 A1*   8/2009    Kato ................. G06F 11/3409
                                                    714/37
(Continued)

FOREIGN PATENT DOCUMENTS

JP    63-51936 A    3/1988
JP    10-187226 A   7/1998
(Continued)

OTHER PUBLICATIONS

"Comparison of values of Pearson's and Spearman's correlation coefficient on the same sets of data", Jan Hauke, Tomasz Kossowski, Quaestiones Geographicae 30(2), Apr. 19, 2011.
(Continued)

*Primary Examiner* — Sarai E Butler

(57) ABSTRACT

In invariant relation analysis, a correlation model having high abnormality detection ability is generated.
A system analysis device (100) includes a correlation function storage unit (1022), and a correlation function extraction unit (1023). The correlation function storage unit (1022) stores a plurality of candidates for a correlation function expressing a correlation for each pair of metrics in a system. The correlation function extraction unit (1023) extracts a correlation function from a plurality of candidates for a correlation function as a correlation function for each pair of metrics, on the basis of a detection sensitivity indicating a likelihood of correlation destruction caused at the time of abnormality of a metric associated with a correlation function.

19 Claims, 10 Drawing Sheets

| CORRELATION FUNCTION | NON-OBJECTIVE METRIC | OBJECTIVE METRIC | COEFFICIENT OF CORRELATION FUNCTION | | | | | DETECTION SENSITIVITY TO NON-OBJECTIVE METRIC | DETECTION SENSITIVITY TO OBJECTIVE METRIC | PREDICTION ERROR (PE) |
|---|---|---|---|---|---|---|---|---|---|---|
| | | | $b_0$ | $b_1$ | $b_2$ | $b_3$ | c | | | |
| $f_1(A,B)$ | B | A | −0.56 | 3.18 | 0 | 0 | −8767 | 0.042 | 0.016 | 63 |
| $f_2(A,B)$ | B | A | 0 | 1.46 | 1.23 | 0 | −9264 | 0.069 | 0.026 | 39 |
| $f_3(A,B)$ | B | A | 0 | 0 | 3.27 | −0.66 | −8680 | 0.033 | 0.012 | 80 |
| $f_4(B,A)$ | A | B | 0.90 | −0.58 | 0 | 0 | 3891 | 0.025 | 0.077 | 13 |
| $f_5(B,A)$ | A | B | 0 | 1.07 | −0.80 | 0 | 4284 | 0.007 | 0.026 | 39 |
| $f_6(B,A)$ | A | B | 0 | 0 | 1.10 | −0.88 | 4738 | 0.004 | 0.018 | 54 |

EXTRACT CORRELATION FUNCTION EXHIBITING MAXIMUM DETECTION SENSITIVITY TO NON-OBJECTIVE METRIC $f_2(A,B)$

(51) Int. Cl.
- G06F 11/34 (2006.01)
- G05B 23/02 (2006.01)
- G06F 11/07 (2006.01)
- H04L 12/24 (2006.01)
- H04L 12/26 (2006.01)

(52) U.S. Cl.
CPC ........ *G06F 11/079* (2013.01); *G06F 11/0751* (2013.01); *G06F 11/34* (2013.01); *G06F 11/3447* (2013.01); *H04L 41/0631* (2013.01); *H04L 41/147* (2013.01); *H04L 43/08* (2013.01)

(56) References Cited

U.S. PATENT DOCUMENTS

2010/0050023 A1* 2/2010 Scarpelli ............. G06F 11/0709 714/46
2012/0254414 A1 10/2012 Scarpelli
2014/0358833 A1* 12/2014 Biem .................... G06N 5/046 706/21

FOREIGN PATENT DOCUMENTS

| JP | 2006-135412 A | 5/2006 |
| JP | 4872944 B2 | 9/2009 |

OTHER PUBLICATIONS

Extended European Search Report for EP Application No. EP14756788.7 dated on Jun. 24, 2016.

International Search Report for PCT Application No. PCT/JP2014/000950, dated Apr. 8, 2014.

English translation of Written opinion for PCT Application No. PCT/JP2014/000950.

\* cited by examiner

SYSTEM ANALYSIS DEVICE AND SYSTEM ANALYSIS METHOD

This application is a National Stage Entry of PCT/JP2014/000950 filed on Feb. 24, 2014, which claims priority from Japanese Patent Application 2013-035785 filed on Feb. 26, 2013, the contents of all of which are incorporated herein by reference, in their entirety.

TECHNICAL FIELD

The present invention relates to a system analysis device and a system analysis method.

BACKGROUND ART

An example of an operation management system which models a system by using time-series information about system performance and determines a cause of failure, abnormality, or the like of the system by using the generated model is described in PTL 1.

The operation management system described in PTL1 generates a correlation model of a system by determining correlation functions expressing correlations between each pair of a plurality of metrics on the basis of measurements of the plurality of metrics of the system. Then, the operation management system detects destruction of correlations (correlation destruction) by using the generated correlation model to determine a failure cause of the system on the basis of the correlation destruction. This technology for analyzing a state of a system on the basis of correlation destruction is called invariant relation analysis.

As a related technology, a method for, when there is a change in a physical quantity of each of a plurality of points in a process from a reference point, determining failure points on the basis of correlations between points, is disclosed in PTL 2.

CITATION LIST

Patent Literature

[PLT1] Japanese Patent Publication No. 4872944
[PLT2] Japanese Patent Application Laid-Open Publication No. S63-51936

SUMMARY OF INVENTION

Technical Problem

The invariant relation analysis according to PTL1 determines a correlation function $f(y, u)$ for a pair of metrics y and u to predict the metric y. Hereinafter, the metric y predicted on the basis of the correlation function $f(y, u)$ is referred to as an objective metric, while the other metric u is referred to as a non-objective metric. The correlation function $f(y, u)$ is determined such that a value of prediction accuracy (fitness) is maximized.

However, even if the correlation function $f(y, u)$ is determined on the basis of prediction accuracy, the correlation function $f(y, u)$ may be generated with low abnormality detection ability under the situation that an effect of abnormality of the non-objective metric or the objective metric imposed on a prediction value of the objective metric is small.

FIG. 9 is a diagram illustrating an example of a correlation function having low abnormality detection ability. In case of the example illustrated in FIG. 9, the correlation function is close to an autoregressive model, wherefore abnormality of the non-objective metric u has a small effect on the prediction value of the objective metric y. For this reason, a prediction error does not exceed a threshold and thus does not produce correlation destruction even if an abnormality occurs in the non-objective metric u, as illustrated in Case 2, so that an abnormality of the metric u may be undetectable.

FIG. 10 is a diagram illustrating another example of a correlation function having low abnormality detection ability. According to the example illustrated in FIG. 10, an effect imposed on the prediction value of the objective metric y by abnormality of the objective metric y is small as a result of previous time-series addition and subtraction of the objective metric y in the correlation function. For this reason, a prediction error does not exceed a threshold and thus does not produce correlation destruction even if an abnormality occurs in the objective metric y, as illustrated in Case 2, so that an abnormality of the metric y may be undetectable.

An object of the present invention is to solve the aforementioned problem, and to provide a system analysis device and a system analysis method, which are capable of generating a correlation model having high abnormality detection ability in invariant relation analysis.

Solution to Problem

A system analysis device according to an exemplary aspect of the invention includes: a correlation function storage means for storing a plurality of candidates for a correlation function that represents a correlation of a pair of metrics in a system; and a correlation function extraction means for extracting one correlation function as the correlation function for the pair of metrics from the plurality of candidates for the correlation function on the basis of a detection sensitivity indicating a likelihood of correlation destruction caused at the time of abnormality of a metric associated with a correlation function.

A system analysis method according to an exemplary aspect of the invention includes: storing a plurality of candidates for a correlation function that represents a correlation of a pair of metrics in a system; and extracting one correlation function as the correlation function for the pair of metrics from the plurality of candidates for the correlation function on the basis of a detection sensitivity indicating a likelihood of correlation destruction caused at the time of abnormality of a metric associated with a correlation function.

A computer readable storage medium according to an exemplary aspect of the invention records thereon a program, causing a computer to perform a method including: storing a plurality of candidates for a correlation function that represents a correlation of a pair of metrics in a system; and extracting one correlation function as the correlation function for the pair of metrics from the plurality of candidates for the correlation function on the basis of a detection sensitivity indicating a likelihood of correlation destruction caused at the time of abnormality of a metric associated with a correlation function.

Advantageous Effects of Invention

An advantageous effect of the present invention is that it is possible to generate a correlation model having high abnormality detection ability in invariant relation analysis.

DESCRIPTION OF EMBODIMENTS

Exemplary embodiments will be described below by using an example of invariant relation analysis in an IT (Information Technology) system.

(First Exemplary Embodiment)

A first exemplary embodiment of the present invention is hereinafter described.

Figure 2:
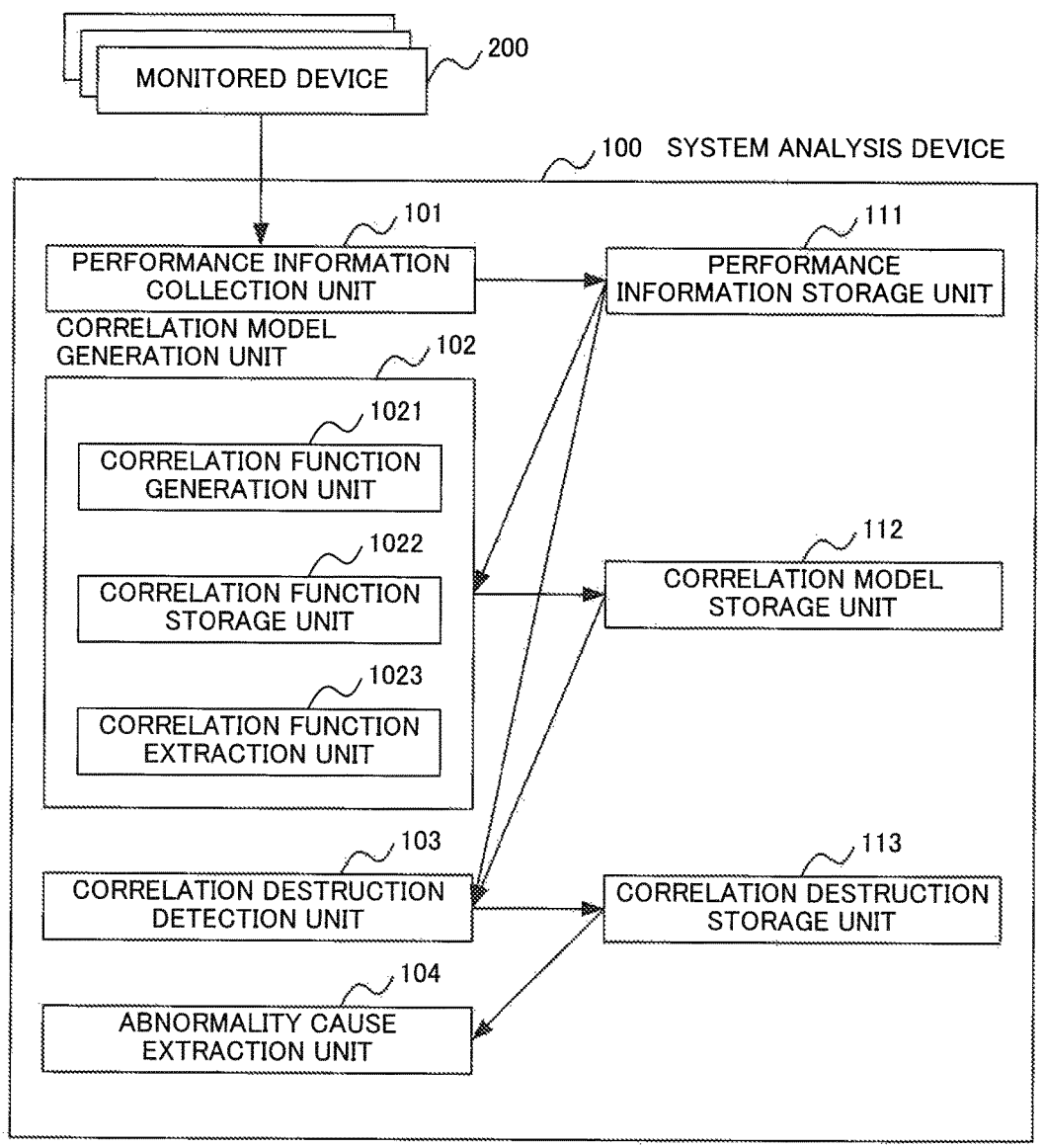
FIG. 2 is a block diagram illustrating a configuration of a system analysis device 100 according to the first exemplary embodiment of the present invention.

First, a configuration according to the first exemplary embodiment of the present invention is described. FIG. 2 is a block diagram illustrating a configuration of a system analysis device 100 according to the first exemplary embodiment of the present invention.

Referring to FIG. 2, the system analysis device 100 according to the first exemplary embodiment of the present invention is connected with a monitored system including one or more monitored devices 200. Each of the monitored devices 200 is a device, such as a server device and a network device of various types, constituting an IT system.

The monitored device 200 obtains measurement data (measurements) about performance values of the monitored device 200 for a plurality of items at regular intervals, and transmits the obtained data to the system analysis device 100. The items of the performance values include, for example, use rates and use volumes of computer resources and network resources, such as a CPU (Central Processing Unit) use rate, a memory use rate, and a disk access frequency.

It is assumed herein that a set of the monitored device 200 and a performance value item are defined as a metric (performance index), and that a set of a plurality of metrics measured at an identical time is defined as performance information. Each metric is expressed in a numerical value such as an integer and a decimal. It is preferable herein that the respective performance values are normalized values. As a method for normalization, for example, a method for transforming values in such a way as to have an average 0 and a variance 1, or have a maximum value 1 and a minimum value −1. Each metric corresponds to an "element" for which a correlation model is generated in PTL1.

The system analysis device 100 generates a correlation model 122 of the monitored devices 200 on the basis of performance information collected from the monitored devices 200, and analyzes a state of the monitored devices 200 on the basis of correlation destruction detected by using the generated correlation model 122.

The system analysis device 100 includes a performance information collection unit 101, a correlation model generation unit 102, a correlation destruction detection unit 103, an abnormality cause extraction unit 104, a performance information storage unit 111, a correlation model storage unit 112, and a correlation destruction storage unit 113.

The performance information collection unit 101 collects performance information from the monitored devices 200.

The performance information storage unit 111 stores a time-series change of the performance information collected by the performance information collection unit 101 as performance series information.

The correlation model generation unit 102 generates the correlation model 122 of the monitored system on the basis of the performance series information. The correlation model 122 includes correlation functions (or prediction expressions) expressing correlations of respective pairs of metrics.

The correlation model generation unit 102 includes a correlation function generation unit 1021, a correlation function storage unit 1022, and a correlation function extraction unit 1023.

The correlation function generation unit 1021 generates a plurality of correlation functions for each pair of metrics. Each of the correlation functions is a function for predicting one of values of a pair of metrics based on time series of both of the pair, or time series of the other of the pair. Hereinafter, a metric in a pair of metrics predicted based on the correlation function is referred to as an objective metric, while the other metric in the pair of metrics is referred to as a non-objective metric.

The correlation function generation unit 1021 determines a correlation function f(y, u) for a pair of metrics y(t) and u(t) by using Equation 1 (Math 1) in system identification processing executed for performance information in a predetermined modeling period, similarly to the operation management device in PTL1. The metrics y(t) and u(t) correspond to an objective metric and a non-objective metric, respectively. Values $a_n$ (n=1 through N) and $b_m$ (m=0 through M) are coefficients to be multiplied by y(t−n) and u(t−K−m), respectively.

$$\hat{y}(t)=f(y,u)=a_1 y(t-1)+ \ldots +a_N y(t-N)+ b_0 u(t-K)+ \ldots +b_M u(t-K-M)+c \quad \text{[Math 1]}$$

ŷ(t): PREDICTION VALUE OF OBJECTIVE METRIC
y(t): MEASUREMENT OF OBJECTIVE METRIC
u(t): MEASUREMENT OF NON-OBJECTIVE METRIC

The correlation function generation unit 1021 generates correlation functions for each pair of metrics, for example, with a plurality of predetermined combinations of parameters N, K, and M in Equation 1.

The correlation function storage unit 1022 stores the correlation functions generated by the correlation function generation unit 1021 as candidates for a correlation function to be determined as the correlation model 122.

Figure 4:
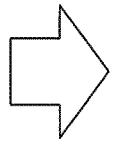
FIG. 4 is a diagram illustrating an example of extraction of a correlation function according to the first exemplary embodiment of the present invention.

FIG. 4 is a diagram illustrating an example of extraction of a correlation function according to the first exemplary embodiment of the present invention. In the example of FIG. 4, correlation functions f1(A, B), f2(A, B), and f3(A, B), which have different combinations of the parameters K and M, and whose objective metric is the metric A, are generated for a pair of metrics A and B. In addition, correlation functions f4(B, A), f5(B, A), and f6(B, A), whose objective metric is the metric B, are also generated. In the example of FIG. 4, only the coefficient $b_m$ to be multiplied by a non-objective metric in a correlation function is illustrated, while the coefficient $a_n$ to be multiplied by an objective metric is omitted, for the purpose of simplification.

The correlation function extraction unit 1023 extracts a correlation function to be determined as the correlation model 122 from the plurality of candidates for a correlation function for respective pairs of metrics.

The correlation function extraction unit 1023 extracts a correlation function exhibiting a higher detection sensitivity than detection sensitivities of the other correlation functions. The detection sensitivity indicates a degree of effect imposed on a prediction value by abnormality of a metric associated with a correlation function, in other words, a likelihood of correlation destruction caused at the time of abnormality of the metric.

A method for calculating the detection sensitivity according to the first exemplary embodiment of the present invention is hereinafter described.

When a correlation is expressed by a correlation function in Equation 1 described above, a prediction error of a prediction value of an objective metric in the correlation function tends to increase in either the positive direction or the negative direction, at the time of a physical failure associated with either one of a pair of metrics. In this case, the likelihood of correlation destruction in the correlation at the time of abnormality of the metric can be approximately expressed by using the sum of the coefficients of the correlation function expressing the correlation.

It is possible to extract a correlation function exhibiting a higher likelihood of correlation destruction by selecting a correlation function having a large sum of coefficients. However, in this case, a correlation function producing a large prediction error may be extracted. Accordingly, in the first exemplary embodiment of the present invention, the detection sensitivity is defined as a value obtained by standardizing a sum of coefficients in a correlation function with a magnitude of a prediction error.

When the correlation function f(y, u) in Equation 1 is defined for the pair of metrics y and u, for example, the detection sensitivity is calculated as follows. A detection sensitivity $S_y$ to the objective metric y is calculated by dividing the sum of coefficients to be multiplied by the objective metric y in the correlation function f(y, u) by a magnitude of a prediction error, as expressed in Equation 2 (Math 2). On the other hand, a detection sensitivity $S_u$ to the non-objective metric u is calculated by dividing the sum of coefficients to be multiplied by the non-objective metric u in the correlation function f(y, u) by the magnitude of the prediction error, as expressed in Equation 3 (Math 3).

$$S_y = \frac{\left|1 + \sum_{i=1}^{N} a_i\right|}{PE} \quad \text{[Math 2]}$$

$$S_u = \frac{\left|\sum_{i=0}^{M} b_i\right|}{PE} \quad \text{[Math 3]}$$

In these equations, a value PE indicates the magnitude of the prediction error in the correlation function f(y, u). The value of the PE is determined by the correlation function generation unit 1021, for example, on the basis of the maximum value or a standard deviation of the prediction error for performance information during a modeling period.

For example, in FIG. 4, a detection sensitivity of the correlation function f2(A, B) to the non-objective metric B is calculated as 0.069 by Equation 3, by using coefficients $b_0$ (=0), $b_1$ (=1.46), $b_2$(=1.23), and $b_3$ (=0) to be multiplied by the non-objective metric B, and the magnitude PE (=39) of the prediction error.

Figure 9:
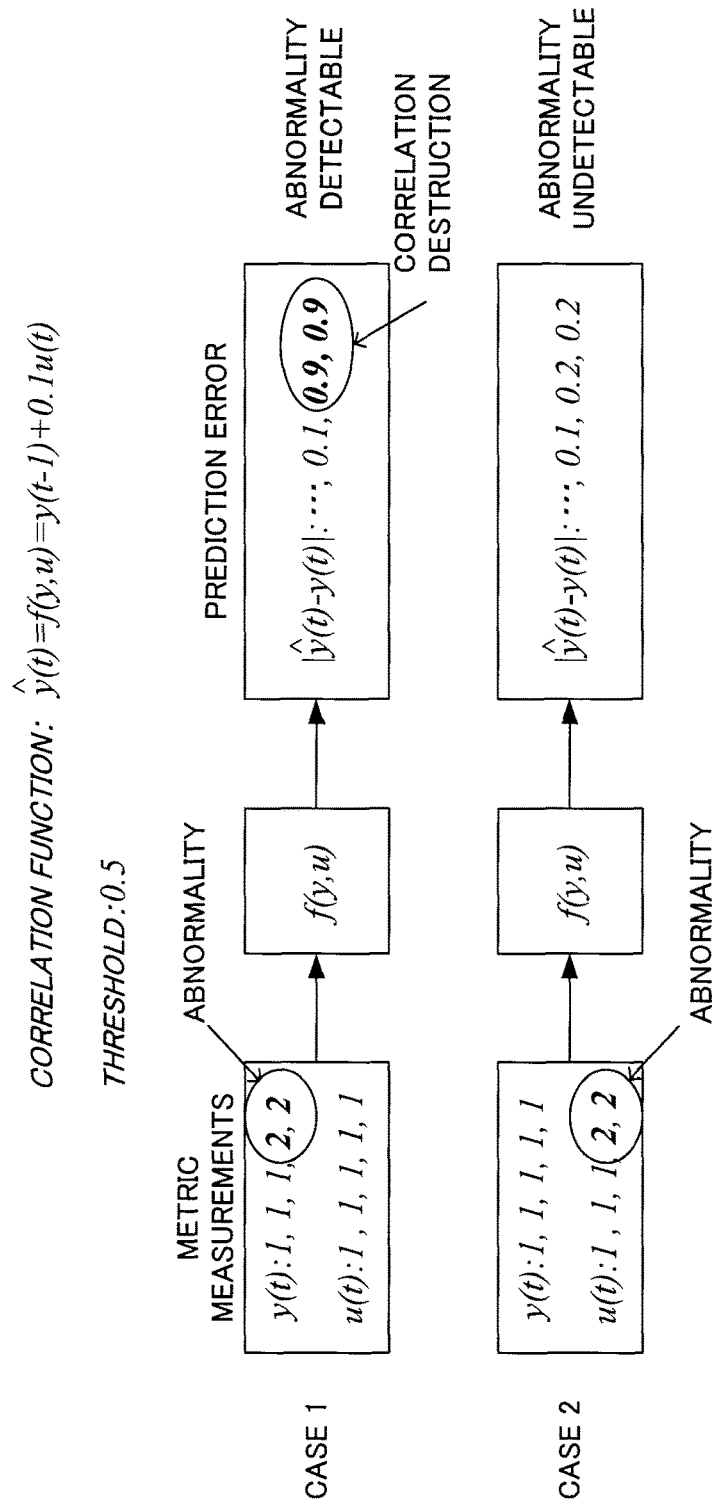
FIG. 9 is a diagram illustrating an example of a correlation function having low abnormality detection ability.
Figure 10:
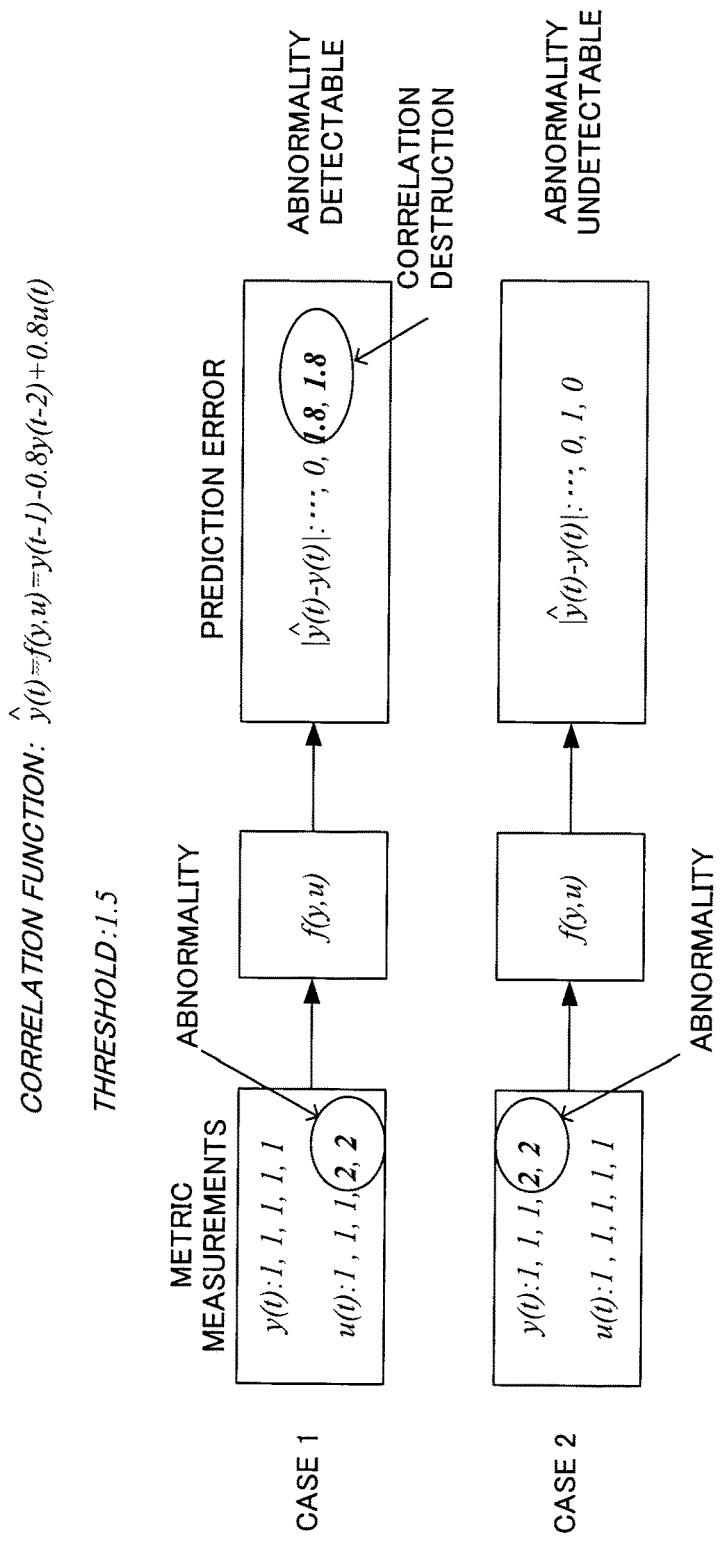
FIG. 10 is a diagram illustrating another example of a correlation function having low abnormality detection ability.

Note that there is a correlation between the detection sensitivity $S_y$ to the objective metric y and the detection sensitivity $S_u$ to the non-objective metric u. Accordingly, a correlation function exhibiting a high likelihood of correlation destruction at the time of abnormality of the objective metric y or the non-objective metric u is extractable by using any one of the detection sensitivity $S_y$ and the detection sensitivity $S_u$. In the first exemplary embodiment of the present invention, a correlation function is extracted by using the detection sensitivity $S_u$ to the non-objective metric u, which is more effective in reducing the problem in the case that a correlation function is similar to an autoregressive model as shown in FIG. 9.

The correlation function extraction unit 1023 determines the extracted correlation functions as the correlation model 122.

Figure 5:
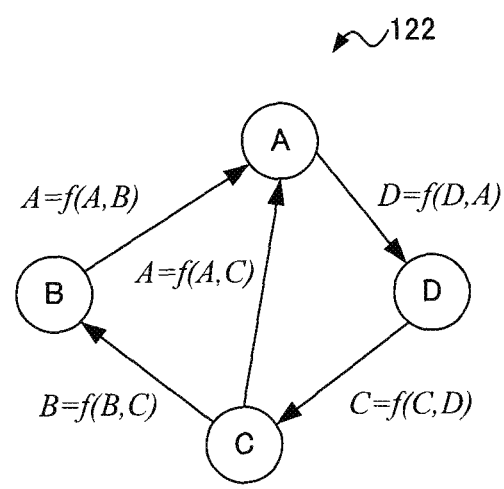
FIG. 5 is a diagram illustrating an example of a correlation model 122 according to the first exemplary embodiment of the present invention.

FIG. 5 is a diagram illustrating an example of the correlation model 122 according to the first exemplary embodiment of the present invention. In FIG. 5, the correlation model 122 is illustrated as a graph containing nodes and arrows. In this case, each of the nodes indicates a metric, while each of the arrows illustrated between the respective metrics indicates a correlation. A metric illustrated at a destination of each of the arrows corresponds to an objective metric.

In the correlation model 122 of FIG. 5, one metric is present for each of the monitored devices 200 to which device identifiers A through D are given (hereinafter referred to as metrics A through D). A correlation function is defined for each of pairs in the metrics A through D.

The correlation model storage unit 112 stores the correlation model 122 generated by the correlation model generation unit 102.

The correlation destruction detection unit 103 detects correlation destruction of correlations in the correlation model 122 for newly input performance information.

The correlation destruction detection unit 103 detects correlation destruction for respective pairs of metrics similarly to the operation management device in PTL1. The correlation destruction detection unit 103 detects correlation destruction of a correlation for a pair when a difference (prediction error) between a measurement of an objective metric and a prediction value of the objective metric obtained by input of a measurement of a metric into the correlation function is equal to or greater than a predetermined threshold.

The correlation destruction storage unit 113 stores correlation destruction information indicating a correlation for which correlation destruction is detected.

The abnormality cause extraction unit 104 extracts a candidate for a metric (abnormality cause metric) in which an abnormality occurs, on the basis of the correlation destruction information. The abnormality cause extraction unit 104 extracts the candidate for the abnormality cause metric, on the basis of the number or ratio of correlation destruction for each metric, similarly to the operation management device in PTL1, for example.

The system analysis device 100 may be configured by a computer which includes a CPU and a storage medium storing a program, and operates under control of the program. The performance information storage unit 111, the correlation function storage unit 1022, the correlation model storage unit 112, and the correlation destruction storage unit 113 may be either separate storage devices for each, or configured by a one-piece storage medium.

Next, an operation of the system analysis device 100 according to the first exemplary embodiment of the present invention is described.

Figure 3:
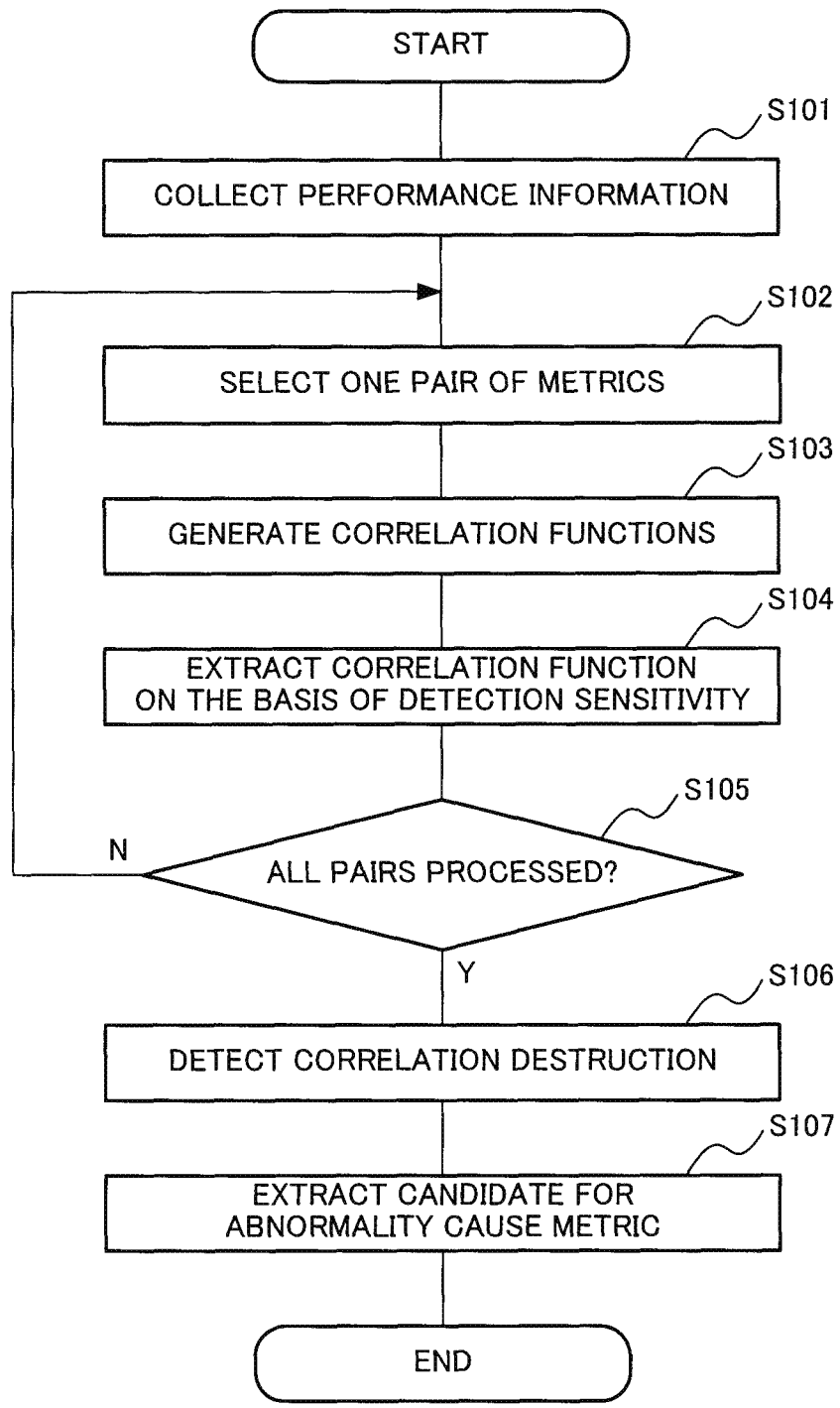
FIG. 3 is a flowchart illustrating an operation of the system analysis device 100 according to the first exemplary embodiment of the present invention.

FIG. 3 is a flowchart illustrating an operation of the system analysis device 100 according to the first exemplary embodiment of the present invention.

First, the performance information collection unit 101 of the system analysis device 100 collects performance information from the monitored devices 200, and stores the collected performance information in the performance information storage unit 111 (step S101).

For example the performance information collection unit 101 collects performance information on the metrics A through D.

The correlation function generation unit 1021 of the correlation model generation unit 102 refers to performance series information in the performance information storage unit 111, and selects a pair of metrics (step S102).

The correlation function generation unit 1021 generates a plurality of correlation functions for each of pairs of metrics on the basis of performance information during a predetermined modeling period specified by an administrator or the like (step S103). The correlation function generation unit 1021 stores the generated correlation functions in the correlation function storage unit 1022.

For example, the correlation function extraction unit 1023 generates the correlation functions f1(A, B), f2(A, B), f3(A, B), f4(B, A), f5(B, A), and f6(B, A) for the pair of metrics A and B, as illustrated in FIG. 4.

The correlation function extraction unit 1023 calculates a detection sensitivity to a non-objective metric by using Equation 3 for each of the plurality of correlation functions generated by the correlation function generation unit 1021. Then, the correlation function extraction unit 1023 extracts, as a correlation function to be determined as the correlation model 122, a correlation function exhibiting a higher detection sensitivity than detection sensitivities of the other correlation functions (step S104).

For example, the correlation function extraction unit 1023 calculates a detection sensitivity to the non-objective metric for each of the correlation functions of the pair of metrics A and B, as illustrated in FIG. 4. Then, the correlation function extraction unit 1023 extracts the correlation function f2(A, B) exhibiting the maximum detection sensitivity (=0.069) to the non-objective metric as the correlation function to be determined as the correlation model 122, as illustrated in FIG. 4.

The correlation function extraction unit 1023 repeats the processing from step S102 for all of the pairs of metrics (step S105).

The correlation function extraction unit 1023 determines the correlation functions thus extracted as the correlation model 122.

For example, the correlation function extraction unit 1023 extracts a correlation function for each pair in the metrics A through D, as illustrated in FIG. 5.

The correlation destruction detection unit 103 detects correlation destruction of correlations in the correlation model 122, by using performance information newly collected by the performance information collection unit 101, and generates correlation destruction information (step S106). The correlation destruction detection unit 103 stores the correlation destruction information in the correlation destruction storage unit 113.

The abnormality cause extraction unit 104 extracts candidates for an abnormality cause metric on the basis of the correlation destruction information (step S107).

The operation according to the first exemplary embodiment of the present invention is completed by the processing above described.

Figure 1:
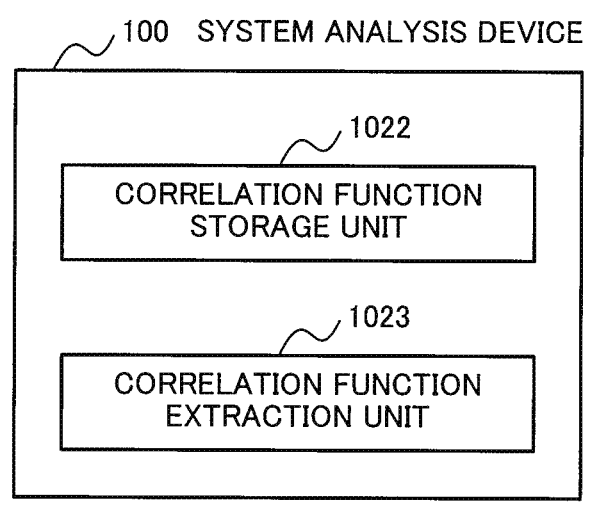
FIG. 1 is a block diagram illustrating a characteristic configuration according to a first exemplary embodiment of the present invention.

Next, a characteristic configuration according to the first exemplary embodiment of the present invention is described. FIG. 1 is a block diagram illustrating a characteristic configuration according to the first exemplary embodiment of the present invention.

Referring to FIG. 1, the system analysis device 100 includes the correlation function storage unit 1022, and the correlation function extraction unit 1023.

The correlation function storage unit 1022 stores a plurality of candidates for a correlation function expressing a correlation for each pair of metrics in a system.

The correlation function extraction unit 1023 extracts a correlation function from a plurality of candidates for a correlation function as a correlation function for each pair of metrics, on the basis of a detection sensitivity indicating a likelihood of correlation destruction caused at the time of abnormality of a metric associated with a correlation function.

According to the first exemplary embodiment of the present invention, a correlation model having high abnormality detection ability is generated in invariant relation analysis. This is because the correlation function extraction unit 1023 extracts a correlation function from a plurality of candidates for a correlation function as a correlation function for a pair of metrics, on the basis of detection sensitivity indicating a likelihood of correlation destruction caused at the time of abnormality of a metric associated with a correlation function.

(Second Exemplary Embodiment)

Next, a second exemplary embodiment according to the present invention is described.

The second exemplary embodiment according to the present invention is different from the first exemplary embodiment of the present invention in that the correlation function extraction unit 1023 extracts a correlation function by using a prediction accuracy (fitness) of a correlation function in addition to a detection sensitivity of the correlation function.

The configuration of the system analysis device 100 according to the second exemplary embodiment of the present invention is similar to the configuration thereof according to the first exemplary embodiment of the present invention (FIG. 2).

The correlation function extraction unit 1023 extracts a correlation function by using a detection sensitivity and a prediction accuracy of the correlation function. The prediction accuracy of a correlation function is calculated by the correlation function generation unit 1021 by Equation 4 (Math 4), for example.

$$F = \left[1 - \sqrt{\frac{\sum_{t=1}^{N} |y(t) - \hat{y}(t)|^2}{\sum_{t=1}^{N} |y(t) - \bar{y}|^2}}\right] \quad \text{[Math 4]}$$

$\bar{y}$: AVERAGE OF OBJECTIVE METRIC

Next, an operation of the system analysis device 100 according to the second exemplary embodiment of the present invention is described.

The operation according to the second exemplary embodiment of the present invention is similar to the operation according to the first exemplary embodiment of the present invention, except for the extraction processing of correlation function executed by the correlation function extraction unit 1023 (step S104 in FIG. 3).

Figure 6:
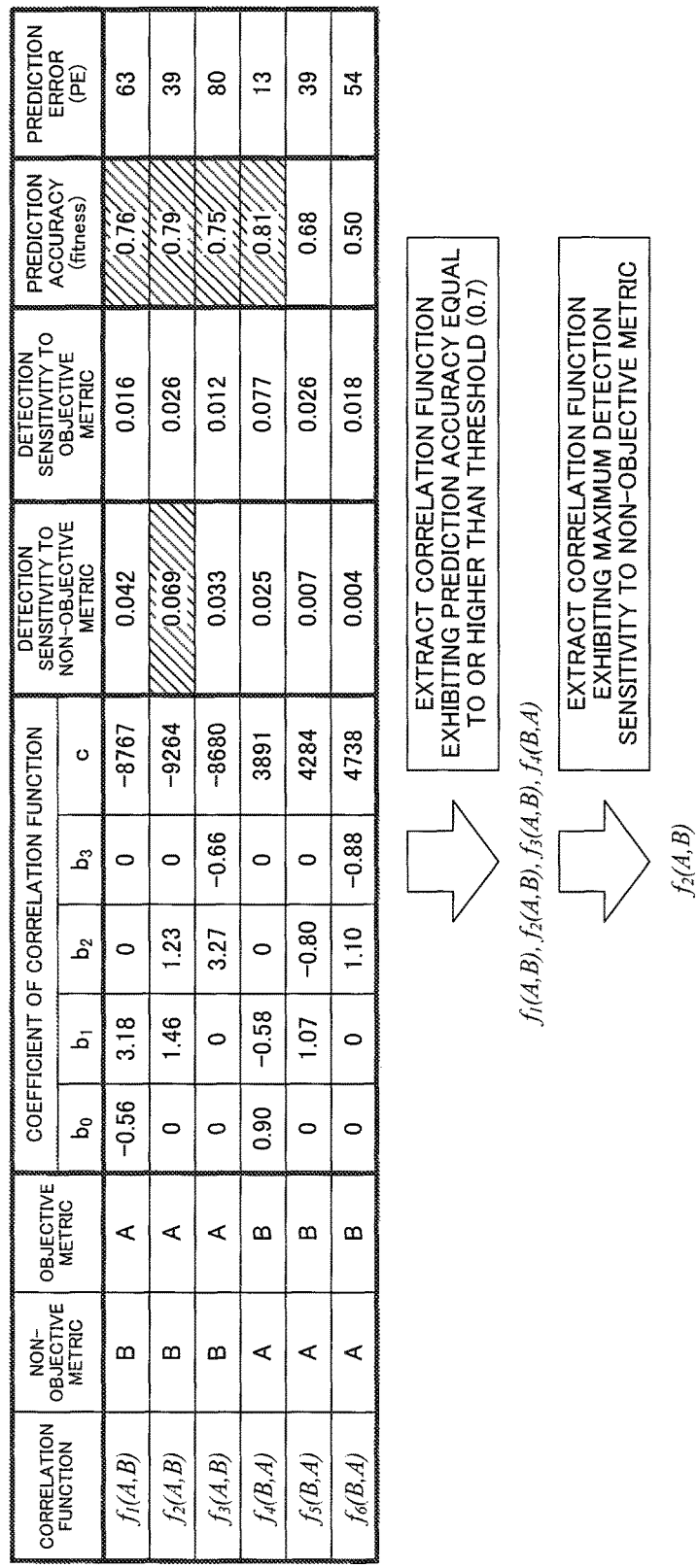
FIG. 6 is a diagram illustrating an example of extraction of a correlation function according to a second exemplary embodiment of the present invention.
Figure 7:
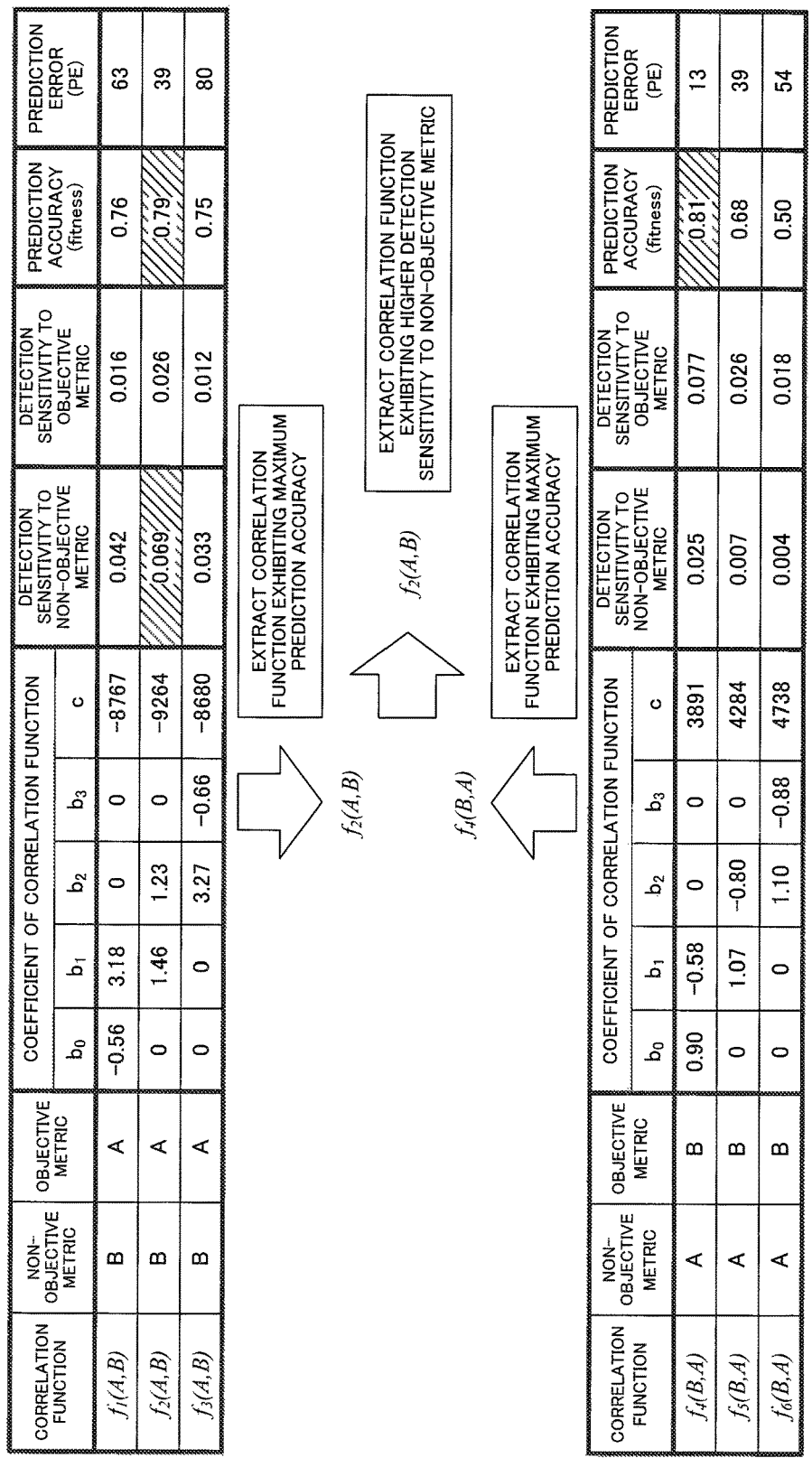
FIG. 7 is a diagram illustrating another example of extraction of a correlation function according to the second exemplary embodiment of the present invention.
Figure 8:
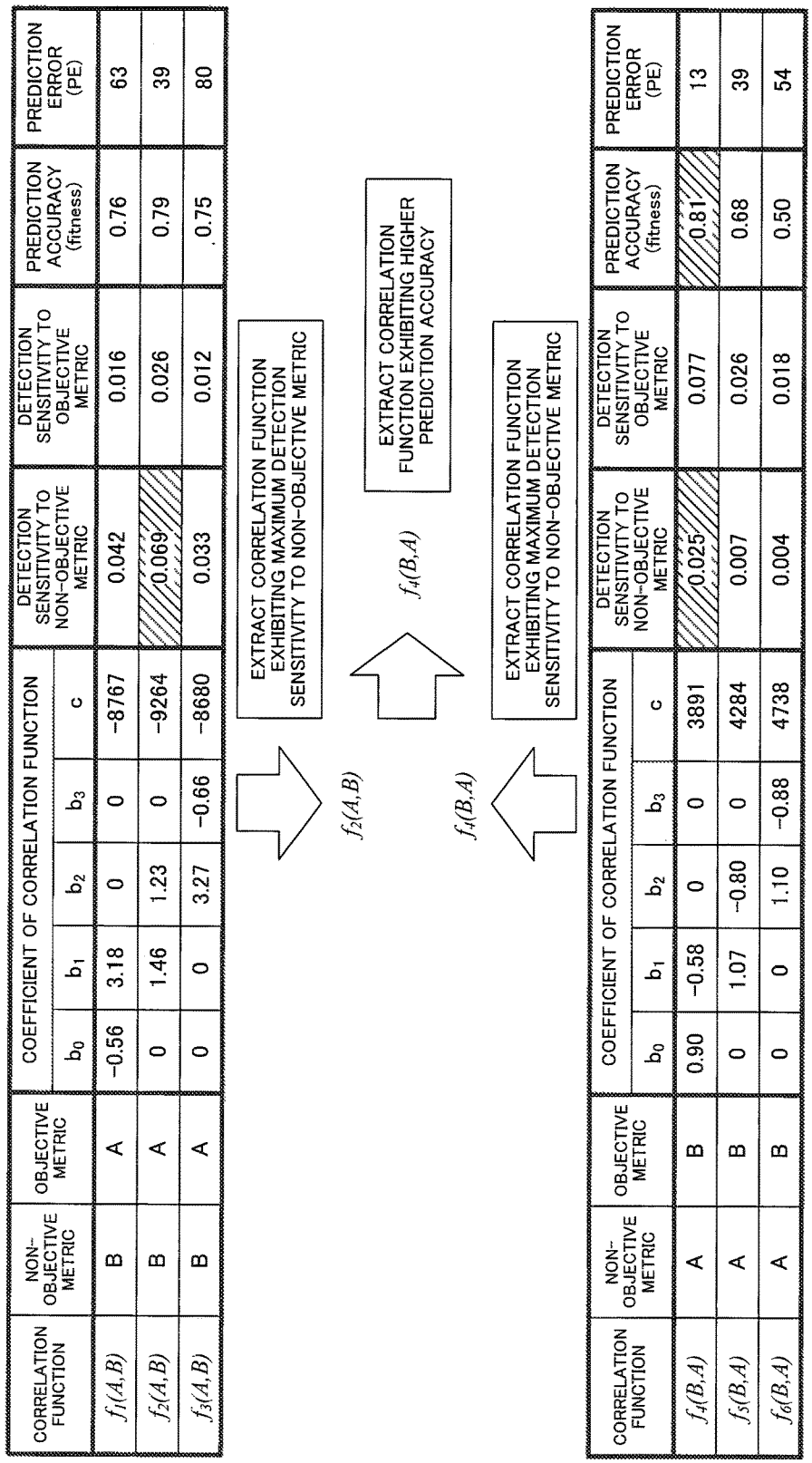
FIG. 8 is a diagram illustrating a further example of extraction of a correlation function according to the second exemplary embodiment of the present invention.

FIGS. 6, 7, and 8 are diagrams each illustrating an example of extraction of a correlation function according to the second exemplary embodiment of the present invention. The prediction accuracy calculated for each correlation function is added to each of FIGS. 6, 7, and 8.

FIG. 6 illustrates an example where correlation functions exhibiting a prediction accuracy equal to or higher than a threshold are extracted.

In this case, in step S104, the correlation function extraction unit 1023 extracts correlation functions exhibiting a prediction accuracy equal to or higher than a predetermined threshold from a plurality of correlation functions generated by the correlation function generation unit 1021, and calculates a detection sensitivity of each of the extracted correlation functions to a non-objective metric. Then, the correlation function extraction unit 1023 extracts, as a correlation function to be determined as the correlation model 122, a correlation function exhibiting a higher detection sensitivity to the non-objective metric than detection sensitivities of the other correlation functions from the extracted correlation functions.

When the threshold of a prediction accuracy is 0.7, for example, the correlation function extraction unit 1023 extracts the correlation functions f1(A, B), f2(A, B), f3(A, B), and f4(B, A) exhibiting a prediction accuracy equal to or higher than 0.7 as illustrated in FIG. 6. Then, the correlation function extraction unit 1023 extracts the correlation function f2(A, B) exhibiting the maximum detection sensitivity (=0.069) to the non-objective metric as the correlation function to be determined as the correlation model 122.

FIG. 7 illustrates an example where correlation functions are extracted by using a prediction accuracy from pairs of correlation functions whose objective metrics are different.

In this case, in step S104, the correlation function extraction unit 1023 extracts, for each metric in a pair of metrics, a correlation function exhibiting a prediction accuracy higher than prediction accuracies of the other correlation functions among correlation functions whose objective metric is the metric. Then, the correlation function extraction unit 1023 extracts, as a correlation function to be determined as the correlation model 122, a correlation function exhibiting a higher detection sensitivity to a non-objective metric from the correlation functions thus extracted.

For example, as illustrated in FIG. 7, the correlation function extraction unit 1023 extracts the correlation function f2(A, B) exhibiting the maximum prediction accuracy (=0.79) from the correlation functions whose objective metric is the metric A. In addition, the correlation function extraction unit 1023 extracts the correlation function f4(B, A) exhibiting the maximum prediction accuracy (=0.81) from the correlation functions whose objective metric is the metric B. Then, the correlation function extraction unit 1023 extracts the correlation function f2(A, B) exhibiting higher detection sensitivity (=0.069) to the non-objection metric as the correlation function to be determined as the correlation model 122.

FIG. 8 illustrates another example where correlation functions are extracted by using a prediction accuracy from pairs of correlation functions whose objective metrics are different.

In this case, in step S104, the correlation function extraction unit 1023 extracts, for each metric in a pair of metrics, a correlation function exhibiting a detection sensitivity to a non-objective metric higher than detection sensitivities of the other correlation functions among correlation functions whose objective metric is the metric. Then, the correlation function extraction unit 1023 extracts, as a correlation function to be determined as the correlation model 122, a correlation function exhibiting a higher prediction accuracy from the correlation functions thus extracted.

For example, as illustrated in FIG. 8, the correlation function extraction unit 1023 extracts the correlation function f2(A, B) exhibiting the maximum detection sensitivity (=0.069) to the non-objective metric from the correlation functions whose objective metric is the metric A. In addition, the correlation function extraction unit 1023 extracts the correlation function f4(B, A) exhibiting the maximum detection sensitivity (=0.025) to the non-objective metric from the correlation functions whose objective metric is the metric B. Then, the correlation function extraction unit 1023 extracts the correlation function f4(B, A) exhibiting higher prediction accuracy (=0.81) as the correlation function to be determined as the correlation model 122.

Further, the correlation function extraction unit 1023 may extract a correlation function by using a method combined the foregoing methods. For example, the correlation function extraction unit 1023 may extract a correlation function by using the method illustrated in FIG. 8 from correlation functions exhibiting a prediction accuracy equal to or higher than a predetermined threshold and extracted in a manner similar to the method illustrated in FIG. 6.

The operation according to the second exemplary embodiment of the present invention is completed by the processing above described.

According to the second exemplary embodiment of the present invention, a correlation model having high abnormality detection ability and high prediction accuracy can be generated. This is because the correlation function extraction unit 1023 extracts a correlation function by using a prediction accuracy of a correlation function in addition to a detection sensitivity of the correlation function.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, while a detection sensitivity to a metric of a correlation function is calculated by using Equation 2 and Equation 3 in the exemplary embodiments of the present invention, detection sensitivity may be calculated by other methods as long as a larger value is obtainable in accordance with increase in coefficients to be multiplied by a metric. For example, the correlation function extraction unit 1023 may determine the detection sensitivity by using coefficients to be multiplied by a metric and a measurement of the metric. Further, the correlation function extraction unit 1023 may determine the detection sensitivity by using a constant value decided depending on whether a metric in a pair of metrics is a non-objective metric or an objective metric. Furthermore, the detection sensitivity may be determined by a method other than methods using coefficients as long as a likelihood of correlation destruction caused at the time of abnormality of a metric is indicated.

While a correlation function is extracted by using a detection sensitivity to a non-objective metric according to the exemplary embodiments of the present invention, a correlation function may be extracted by using a detection sensitivity to an objective metric. Further, a correlation function may be extracted by using both of a detection sensitivity to a non-objective metric and a detection sensitivity respective to an objective metric, such as a sum of squares of the detection sensitivity to a non-objective metric and the detection sensitivity to an objective metric, for example. Furthermore, a correlation function may be extracted based on an index in which different types of indexes are combined, such as a sum of squares of a detection sensitivity and a prediction accuracy.

While one correlation function is extracted for a pair of metrics in the exemplary embodiments of the present invention, correlation functions whose objective metrics are respective metrics of a pair may be extracted. In other words, two correlation functions may be extracted for a pair of metrics.

While description is made assuming that a correlation function is present for each pair of metrics in the exemplary embodiments of the present invention, the presence or absence of the correlation may be determined on the basis of a threshold for a prediction accuracy or a detection sensitivity. In this case, extraction of a correlation function may not be performed, or detection of correlation destruction and extraction of candidates for abnormality cause may not be performed for a pair of metrics determined as a pair not having a correlation.

According to the exemplary embodiments of the present invention, as a monitored system, an IT system including a server device, a network device, or the like as the monitored device 200 is used. However, the monitored system may be other types of systems as long as a correlation model of the monitored system can be generated to determine an abnormality cause based on correlation destruction. For example, the monitored system may be a plant system, a structure, transportation equipment, or the like. In this case, the system analysis device 100, for example, generates the correlation model 122 for metrics corresponding to values of various types of sensors, and performs correlation destruction detection and extraction of candidates for abnormality cause.

This application is based upon and claims the benefit of priority from Japanese Patent Application No. 2013-035785, filed on Feb. 26, 2013, the disclosure of which is incorporated herein in its entirety by reference.

INDUSTRIAL APPLICABILITY

The present invention is applicable to invariant relation analysis for determining a cause of system abnormality or failure based on correlation destruction detected on a correlation model.

REFERENCE SIGNS LIST 100 system analysis device
101 performance information collection unit
102 correlation model generation unit
1021 correlation function generation unit
1022 correlation function storage unit
1023 correlation function extraction unit
103 correlation destruction detection unit
104 abnormality cause extraction unit
111 performance information storage unit
112 correlation model storage unit
113 correlation destruction storage unit
122 correlation model
200 monitored device

What is claimed is:

1. A system analysis device comprising:
a correlation function storage unit which stores a plurality of candidate functions of a correlation function representing a correlation of a pair of objective and non-objective metrics in a system and being used for predicting the objective metric; and
a correlation function extraction unit which extracts one of the plurality of candidate functions, as the correlation function used for detecting correlation destruction for the pair of objective and non-objective metrics from the plurality of candidate functions of the correlation function on the basis of a detection sensitivity of each of the plurality of candidate functions to at least on of the objective and non-objective metrics, the detection sensitivity to the objective or non-objective metric indicating a likelihood of causing correlation destruction at the time of abnormality of objective or non-objective metric associated with the correlation function.

2. The system analysis device according to claim 1, wherein
the correlation function extraction unit extracts, as the correlation function for the pair of objective and non-objective metrics, a correlation function exhibiting the detection sensitivity higher than the detection sensitivities of the other correlation functions from the plurality of candidate functions of the correlation function.

3. The system analysis device according to claim 1, wherein
the correlation function for the pair of objective and non-objective metrics is a function that predicts a value of the objective metric based on time series of the objective and non-objective metrics, or time series of the other metric of the pair, and
the detection sensitivity of the correlation function to the objective and non-objective metric associated with the correlation function is determined so as to increase in accordance with a coefficient to be multiplied by the objective and non-objective metric in the correlation function.

4. The system analysis device according to claim 3, wherein
the detection sensitivity of the correlation function to the objective and non-objective metric associated with the correlation function is further determined so as to decrease in accordance with a prediction error of the correlation function.

5. The system analysis device according to claim 1, wherein
the correlation function extraction unit extracts the correlation function from correlation functions exhibiting a prediction accuracy equal to or higher than a predetermined value in the plurality of candidate functions of the correlation function.

6. The system analysis device according to claim 1, further comprising:
a correlation destruction detection unit which detects correlation destruction in a correlation of the pair of objective and non-objective metrics by using the extracted correlation function for the pair of objective and non-objective metrics; and
an abnormality cause extraction unit which extracts a candidate metric of abnormality cause on the basis of the correlation for which the correlation destruction is detected.

7. A system analysis method comprising:
storing a plurality of candidate functions of a correlation function representing a correlation of a pair of objective and non-objective metrics in a system and being used for predictive the objective metric; and
extracting one of the plurality of candidate functions, as the correlation function used for detecting correlation destruction for the pair of objective and non-objective metrics from the plurality of candidate functions the correlation function on the basis of a detection sensitivity of each of the plurality of candidate functions to at least one of the objective or non-objective metric indicating a likelihood of causing correlation destruction at the time of abnormality of the objective or non-objective metric associated with the correlation function.

8. The system analysis method according to claim 7, wherein,
when extracting the correlation function for the pair of objective and non-objective metrics, as the correlation function for the pair of objective and non-objective metrics, extracting a correlation function exhibiting the detection sensitivity higher than the detection sensitivities of the other correlation functions from the plurality of candidate functions of the correlation function.

9. The system analysis method according to claim 7, wherein
the correlation function for the pair of objective and non-objective metrics is a function that predicts a value of the objective metric based on time series of the objective and non-objective metrics, or time series of the non-objective metric, and
the detection sensitivity of the correlation function to the objective or non-objective metric associated with the correlation function is determined so as to increase in accordance with a coefficient to be multiplied by the objectdive or non-objective metric in the correlation function.

10. The system analysis method according to claim 9, wherein
the detection sensitivity of the correlation function to the objective or non-objective metric associated with the correlation function is further determined so as to decrease in accordance with a prediction error of the correlation function.

11. The system analysis method according to claim 7, wherein,
when extracting the correlation function for the pair of objective and non-objective metrics, extracting the correlation function from correlation functions exhibiting a prediction accuracy equal to or higher than a predetermined value in the plurality of candidate functions of the correlation function.

12. The system analysis method according to claim 7, further comprising:
detecting correlation destruction in a correlation of the pair of objective and non-objective metrics by using the extracted correlation function for the pair of objective and non-objective metrics; and
extracting a candidate metric of abnormality cause on the basis of the correlation for which the correlation destruction is detected.

13. A non-transitory computer readable storage medium recording thereon a program, causing a computer to perform a method comprising:
storing a plurality of candidate functions of a correlation function representing a correlation of a pair of objective and non-objective metrics in a system and being used for predicting the objective function; and
extracting one correlation function as the correlation function used for detecting correlation destruction for the pair of objective and non-objective metrics from the plurality of candidate functions of the correlation function on the basis of a detection sensitivity of each of the plurality of candidate functions to at least one of the objective and non-objective metrics, the detection sensitivity to the objective or non-objective metric indicating a likelihood of causing correlation destruction at the time of abnormality of the objective or non-objective metric associated with the correlation function.

14. The non-transitory computer readable storage medium recording thereon the program according to claim 13, wherein,
when extracting the correlation function for the pair of objective and non-objective metrics, as the correlation function for the pair of objective and non-objective metrics, extracting a correlation function exhibiting the detection sensitivity higher than the detection sensitivities of the other correlation functions from the plurality of candidate functions of the correlation function.

15. The non-transitory computer readable storage medium recording thereon the program according to claim 13, wherein
the correlation function for the pair of objective and non-objective metrics is a function that predicts a value of the objective metric based on time series of the objective and non-objective metrics, or time series of the non-objective metric of the pair, and
the detection sensitivity of the correlation function to the objective or non-objective metric associated with the correlation function is determined so as to increase in accordance with a coefficient to be multiplied by the objective or non-objective metric in the correlation function.

16. The non-transitory computer readable storage medium recording thereon the program according to claim 15, wherein
the detection sensitivity of the correlation function to the objective or non-objective metric associated with the correlation function is further determined so as to decrease in accordance with a prediction error of the correlation function.

17. The non-transitory computer readable storage medium recording thereon the program according to claim 13, wherein,
when extracting the correlation function for the pair of objective and non-objective metrics, extracting the correlation function from correlation functions exhibiting a prediction accuracy equal to or higher than a predetermined value in the plurality of candidate functions of the correlation function.

18. The non-transitory computer readable storage medium recording thereon the program according to claim 13, further comprising:
detecting correlation destruction in a correlation of the pair of objective and non-objective metrics by using the extracted correlation function for the pair of objective and non-objective metrics; and
extracting a candidate metric of abnormality cause on the basis of the correlation for which the correlation destruction is detected.

19. A system analysis device comprising:
a correlation function storage means for storing a plurality of candidate functions of a correlation function that represents a correlation of a pair of objective and non-objective metrics in a system and being used for predictive the objective metric; and
a correlation function extraction means for extracting one correlation function as the correlation function used for detecting correlation destruction for the pair of objective and non-objective metrics from the plurality of candidate functions of the correlation function on the basis of a detection sensitivity of each of the plurality candidate functions to at least one of the objective and non-objective metrics, the detection sensitivity to the objective or non-objective metric indicating a likelihood of causing correlation destruction at the time of abnormality of the objective or non-objective metric associated with the correlation function.

* * * * *